(12) United States Patent
Itano

(10) Patent No.: US 8,560,198 B2
(45) Date of Patent: Oct. 15, 2013

(54) TRAIN BRAKING DEVICE AND TRAIN BRAKING METHOD

(75) Inventor: Yasuharu Itano, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 182 days.

(21) Appl. No.: 12/935,730

(22) PCT Filed: Jun. 20, 2008

(86) PCT No.: PCT/JP2008/061337
§ 371 (c)(1),
(2), (4) Date: Sep. 30, 2010

(87) PCT Pub. No.: WO2009/153884
PCT Pub. Date: Dec. 23, 2009

(65) Prior Publication Data
US 2011/0029213 A1 Feb. 3, 2011

(51) Int. Cl.
*G06F 19/00* (2011.01)
*G06F 7/70* (2006.01)

(52) U.S. Cl.
USPC ............. 701/70; 301/130; 301/132; 301/133; 301/134; 303/15; 303/16; 303/22.6; 303/22.7; 188/197; 188/199; 701/80; 701/78

(58) Field of Classification Search
USPC ........... 701/70, 78, 80; 303/128, 5, 7–8, 22.6, 303/22.7, 15–16; 188/250 R, 1.1 E, 197, 188/199; 75/121; 291/2; 301/130, 132, 301/133–134
See application file for complete search history.

(56) References Cited

U.S. PATENT DOCUMENTS

| 4,717,209 A | * | 1/1988 | Hagiya et al. ................. 303/149 |
| 4,774,667 A | * | 9/1988 | Kuraoka et al. ................. 701/78 |
| 4,958,512 A | | 9/1990 | Johnsen |
| 5,411,322 A | | 5/1995 | Breen |
| 5,927,822 A | * | 7/1999 | Hart ................................. 303/7 |

(Continued)

FOREIGN PATENT DOCUMENTS

| CN | 1102383 A | 5/1995 |
| CN | 1704275 A | 12/2005 |

(Continued)

OTHER PUBLICATIONS

Automated thickness measuring system for brake shoe of rolling stock; HyunCheol Kim; Whoi-Yul Kim; Applications of Computer Vision (WACV), 2009 Workshop on; Digital Object Identifier: 10.1109/WACV.2009.5403084; Publication Year: 2009 , pp. 1-6.*

(Continued)

*Primary Examiner* — Cuong H Nguyen
(74) *Attorney, Agent, or Firm* — Buchanan Ingersoll & Rooney PC

(57) ABSTRACT

The train braking device includes an air brake controller in which a plurality of friction coefficients corresponding to a brake command and a brake initial velocity are stored, an electropneumatic conversion valve that converts a pressure control signal transmitted from the air brake controller into a pneumatic signal, a relay valve that generates a predetermined brake cylinder pressure corresponding to the pneumatic signal, and a brake cylinder that controls brake shoes according to the brake cylinder pressure, wherein the air brake controller generates the pressure control signal based on the friction coefficients corresponding to the brake command and the brake initial velocity.

6 Claims, 5 Drawing Sheets

(56) References Cited

U.S. PATENT DOCUMENTS

| | | | |
|---|---|---|---|
| 6,893,058 B2* | 5/2005 | Kumar et al. | 291/2 |
| 7,503,631 B2 | 3/2009 | Tezuka | |
| 7,594,682 B2* | 9/2009 | Kumar et al. | 291/2 |
| 7,765,859 B2* | 8/2010 | Connell et al. | 73/121 |
| 2004/0075280 A1* | 4/2004 | Kumar et al. | 291/2 |
| 2005/0253397 A1* | 11/2005 | Kumar et al. | 291/2 |
| 2005/0264102 A1 | 12/2005 | Tezuka | |
| 2006/0273658 A1 | 12/2006 | Halassy-Wimmer et al. | |
| 2009/0255329 A1* | 10/2009 | Connell et al. | 73/121 |

FOREIGN PATENT DOCUMENTS

| | | |
|---|---|---|
| CN | 1791524 A | 6/2006 |
| JP | 3-504706 A | 10/1991 |
| JP | 11-235972 A | 8/1999 |
| JP | 2000-211487 A | 8/2000 |
| JP | 2003-160046 A | 6/2003 |
| JP | 2005-335647 A | 12/2005 |
| JP | 2007-191010 A | 8/2007 |
| WO | 2004/101338 A1 | 11/2004 |

OTHER PUBLICATIONS

Dynamic analysis of disc brake and impact law of related parameters on braking torque; Zhaojun Yang; Changliang Liu; Jixin Wang; Xun Yang; Information and Automation (ICIA), 2010 IEEE International Conference on; Digital Object Identifier: 10.1109/ICINFA.2010.5512052; Publication Year: 2010 , pp. 1478-1483.*

Intelligent predictions on frictional properties of non-asbestos brake shoe for mine hoister based on ANN model; Jiusheng Bao; Zhencai Zhu; Minming Tong; Yan Yin; Intelligent Control and Information Processing (ICICIP), 2011 2nd International Conference on;vol. 2; Digital Object Identifier: 10.1109/ICICIP.2011.6008341; Publication Year: 2011.*

Emergency braking control in automated highway systems with underestimation of friction coefficient; Alvarez, L.; Jingang Yi; Horowitz, R.; Olmos, L.; American Control Conference, 2000. Proceedings of the 2000; vol. 1 , Issue: 6 Digital Object Identifier: 10.1109/ACC.2000.878965; Publication Year: 2000 , pp. 574-579 vol. 1.*

Road identification for anti-lock brake systems equipped with only wheel speed sensors; Wu, Weidong; Yoon, Yongsan Tsinghua Science and Technology; vol. 6 , Issue: 4; Publication Year: 2001 , pp. 383-385.*

International Search Report (PCT/ISA/210) issued on Aug. 26, 2008, by Japanese Patent Office as the International Searching Authority for International Application No. PCT/JP2008/061337.

Written Opinion (PCT/ISA/237) issued on Aug. 26, 2008, by Japanese Patent Office as the International Searching Authority for International Application No. PCT/JP2008/061337.

Office Action (Noticeo f Preliminary Rejection) from Korean Intellectual Property Office dated Jun. 11, 2012, issued in Korean application No. 2010-7023474, with English translation thereof.

Office Action Chinese Patent Office dated Sep. 14, 2012, issued in corresponding Chinese Patent Application No. 200880128831.X, with an English translation thereof.

* cited by examiner

TRAIN BRAKING DEVICE AND TRAIN BRAKING METHOD

TECHNICAL FIELD

The present invention relates to a train braking device and a train braking method.

BACKGROUND ART

A train braking device having an air brake controller is configured such that a pressure control signal is generated based on a brake command and a traveling velocity of a train, a relay valve outputs a brake cylinder pressure corresponding to the pressure control signal, and the brake cylinder pressure acts on brake shoes so as to obtain a predetermined brake force. The brake force is calculated by a product of the brake cylinder pressure and a friction coefficient of the brake shoe. Meanwhile, the friction coefficient changes in a region where the traveling velocity of a train is low and also changes according to a period of use of the brake shoe. To obtain a stable brake force, a train braking device that can control the brake cylinder pressure appropriately according to the change in the friction coefficient is required.

A train braking device described in Patent Document 1 mentioned below is configured to calculate a friction coefficient for each brake notch and then to calculate a brake force. Further, a brake force according to a change in the friction coefficient at low velocity is calculated by using a predetermined friction coefficient pattern.

Patent Document 1: Japanese Patent Application Laid-open No. H11-235972

DISCLOSURE OF INVENTION

Problem to be Solved by the Invention

As for the train braking device described in Patent Document 1, because the friction coefficient changes for each brake notch, there is a problem that its deceleration varies greatly. Because a change in brake shoes due to aged deterioration is not considered, when times for replacement of the brake shoes are different from each other, the friction coefficients of the brake shoes are different from each other and thus a stable brake force cannot be obtained.

The present invention has been achieved in view of the above problems, and an object of the present invention is to provide a train braking device and a train braking method for stabilizing deceleration.

Means for Solving Problem

In order to solve the aforementioned problems, a train braking device for controlling a brake cylinder pressure based on a brake initial velocity and a brake command according to one aspect of the present invention is constructed in such a manner as to include: an air brake controller that stores therein a plurality of friction coefficients corresponding to the brake initial velocity and the brake command and generates a pressure control signal based on the friction coefficients corresponding to the brake initial velocity and the brake command; an electropneumatic conversion valve that converts the pressure control signal into a pneumatic signal; and a relay valve that generates the brake cylinder pressure corresponding to the pneumatic signal.

Effect of the Invention

According to the present invention, deceleration can be stabilized.

Figure 1:
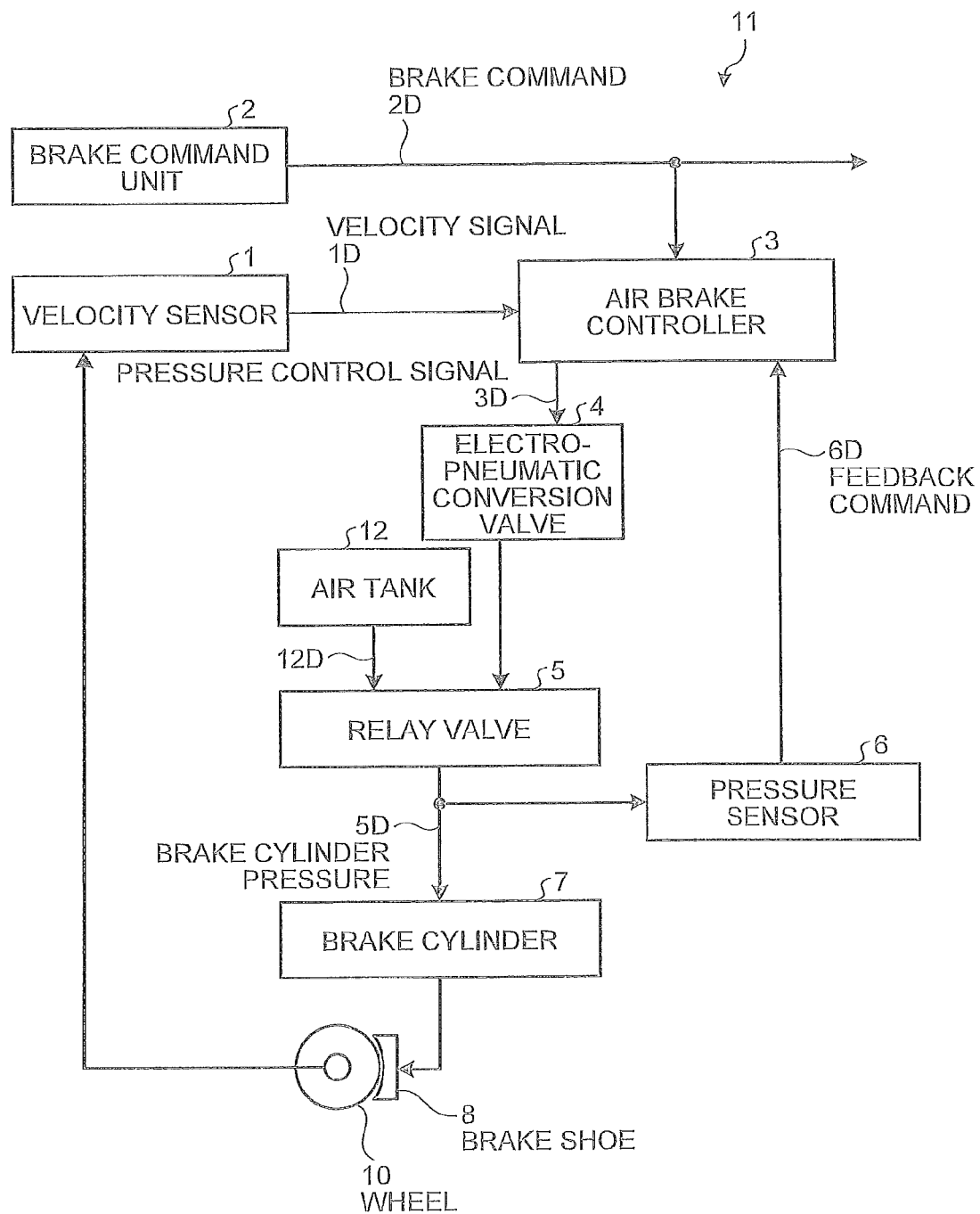
FIG. 1 is an example of a configuration of a train braking device according to a first embodiment.

EXPLANATIONS OF LETTERS OR NUMERALS 1, 1a, 1b, 1c, 1d Velocity sensor
2 Brake command unit
3 Air brake controller
3a Velocity input unit
3b Friction-coefficient calculating unit
3c Brake-force calculating unit
3d Output unit
4 Electropneumatic change valve
5 Relay valve
6 Pressure sensor
7 Brake cylinder
8 Brake shoe
10 Wheel
11 Train braking device
12 Air tank
20 Friction-coefficient setting table
21 Brake notch
22 Brake initial velocity
23 Friction coefficient
1D Velocity signal
2D Brake command
3D Pressure control signal
5D Brake cylinder pressure
6D Feedback command
12D Compressed air
A, B, C Friction coefficient pattern
V1, V2 Traveling velocity

BEST MODE(S) FOR CARRYING OUT THE INVENTION

Exemplary embodiments of a train braking device according to the present invention will be explained below in detail with reference to the accompanying drawings. The present invention is not limited to the embodiments.

First Embodiment

FIG. 1 is an example of a configuration of a train braking device according to a first embodiment. A train braking device 11 shown in FIG. 1 includes, as main constituent elements, a velocity sensor 1, a brake command unit 2, an air brake controller 3, an electropneumatic conversion valve 4, a relay valve 5, a pressure sensor 6, a brake cylinder 7, a brake shoe 8, a wheel 10, and an air tank 12.

The velocity sensor 1 can be placed at front and rear carriages of respective vehicles (four in total) and fetch a velocity signal 1D of the wheel 10. A velocity input unit 3a can fetch the velocity signal 1D from velocity sensors 1a to 1d of each of the vehicles.

The brake command unit 2 can output a brake command 2D for obtaining predetermined deceleration. The air brake controller 3 can receive the brake command 2D transmitted from the brake command unit 2 and a load compensation signal transmitted from a load compensating device (not shown) for detecting the weight of each vehicle to output a predetermined pressure control signal 3D. The pressure control signal 3D is transmitted via the electropneumatic conversion valve 4 to the relay valve 5 and used for generating a brake cylinder pressure 5D.

The electropneumatic conversion valve 4 can convert the pressure control signal 3D (an electrical signal) transmitted from the air brake controller 3 into air of a predetermined pressure (a pneumatic signal). The relay valve 5 is used to amplify the pressure control signal 3D converted into the pneumatic signal so as to have a predetermined value to improve a response of the brake cylinder pressure 5D. The air tank 12 is connected to the relay valve 5. Air of a predetermined pressure (hereinafter, "compressed air") is reserved in the air tank 12, and thus the relay valve 5 outputs compressed air 12D corresponding to the pressure control signal 3D to generate a predetermined brake cylinder pressure 5D.

The pressure sensor 6 can detect the brake cylinder pressure 5D, generate a feedback command 6D based on the brake cylinder pressure 5D, and feed back the feedback command 6D to the air brake controller 3. As a result, the air brake controller 3 can calculate the pressure control signal 3D accurately.

The brake cylinder 7 can press the brake shoe 8 according to a magnitude of the brake cylinder pressure 5D. The brake shoe 8 has a predetermined friction coefficient 23, and a brake force of each wheel 10 can be derived from the product of the friction coefficient 23 and the brake cylinder pressure 5D. To equalize brake forces of the wheels 10, it suffices that the brake cylinder pressure 5D is set to be low, for example, when the friction coefficient 23 of the brake shoe 8 is high, and the brake cylinder pressure 5D is set to be high, for example, when the friction coefficient 23 of the brake shoe 8 is low.

Figure 3:
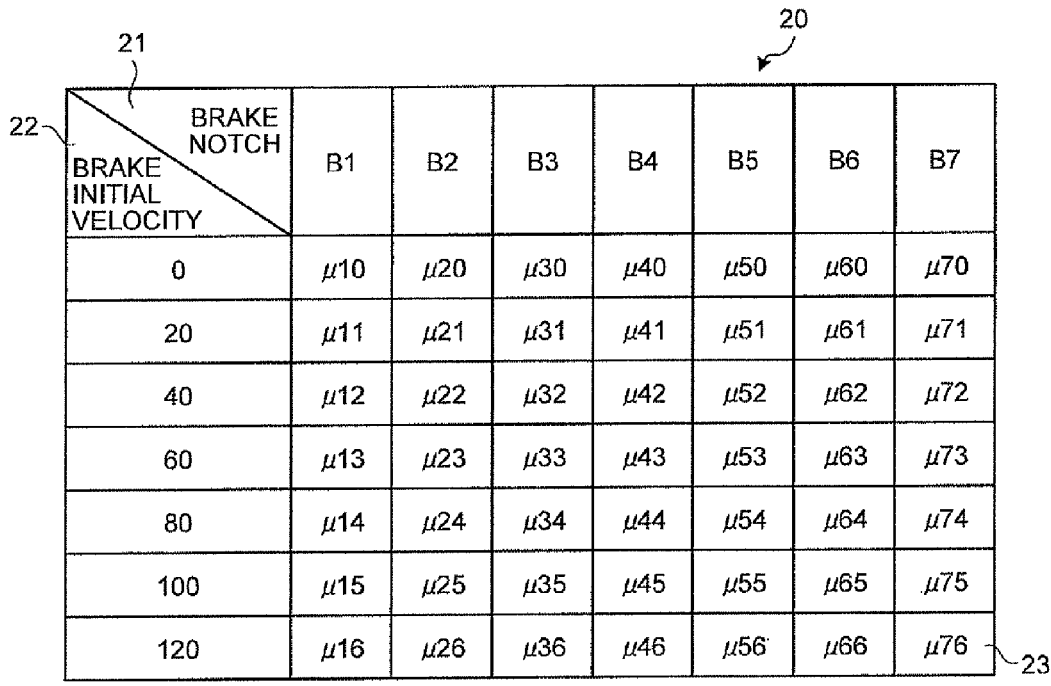
FIG. 3 is an example of a friction-coefficient setting table.

FIG. 3 is an example of a friction-coefficient setting table. A friction-coefficient setting table 20 shown in FIG. 3 is constituted by an item indicating a level of a brake notch 21 and an item indicating a brake initial velocity 22 (a velocity when a train starts to put a brake).

B1 to B7 are shown in the item of the brake notch 21 as a plurality of levels of the brake notch 21. A plurality of predetermined friction coefficients 23 used for calculating the brake cylinder pressure 5D are recorded in each item of the brake notch 21. Each item of the brake notch 21 corresponds to a brake notch level in the brake command unit 2, and the friction-coefficient setting table 20 is thus configured so that the friction coefficient 23 is changed according to the brake notch level. The type of the brake notch 21 shown in FIG. 3 is merely an example and is not limited to a seven-step type.

A plurality of brake initial velocities are shown in the item of the brake initial velocity 22. As described above, the plurality of predetermined friction coefficients 23 are recorded in each item of the brake initial velocity. The friction coefficient 23 is changed according to the brake initial velocity 22. The brake notch 21 corresponds to the brake initial velocity 22. For example, when "B1" is selected in the brake notch 21, the friction coefficient 23 is "μ13" when the brake initial velocity 22 is "60". As the traveling velocity decreases thereafter, the friction coefficient 23 also changes. While 0 km/h to 120 km/h is set in 20 km/h-steps as the brake initial velocity 22 shown in FIG. 3, the present invention is not limited to this setting.

While the friction coefficient 23 is indicated as, for example, "μ10" or "μ20" in the friction-coefficient setting table 20, this is merely an example and predetermined values can be set arbitrarily. Each of the friction coefficients 23 can be set more finely. Further, a plurality of friction-coefficient setting tables 20 can be set for friction coefficients 23 of a plurality of the brake shoes 8.

Figure 2:
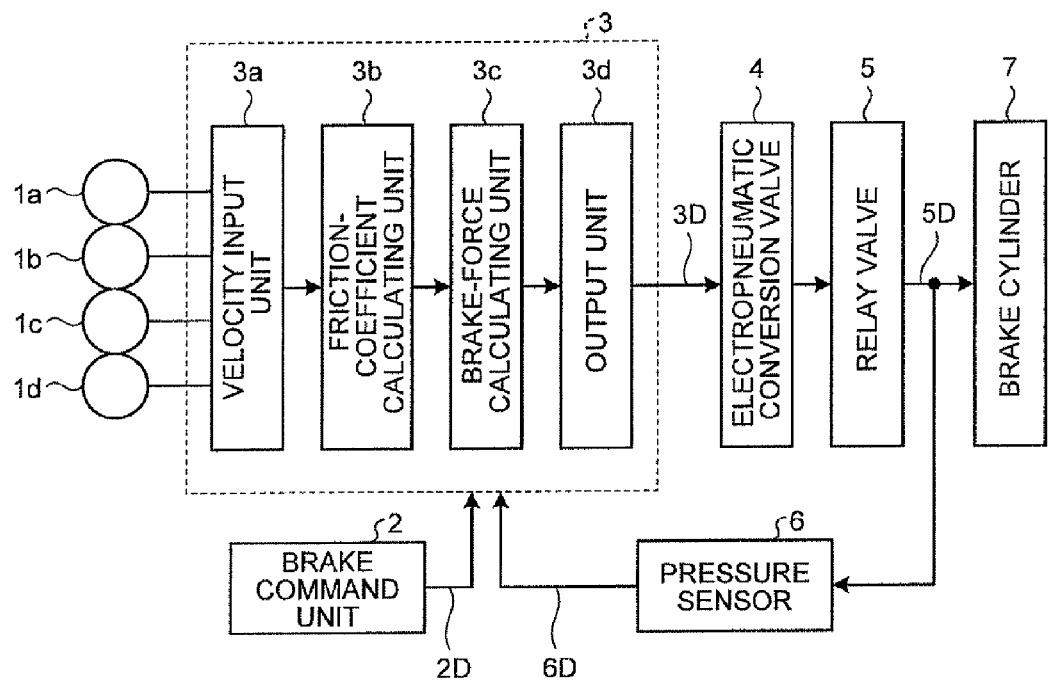
FIG. 2 is a block diagram of functions of an air brake controller.

FIG. 2 is a block diagram of functions of the air brake controller. The air brake controller 3 is configured to include a velocity input unit 3a, a friction-coefficient calculating unit 3b, a brake-force calculating unit 3c, and an output unit 3d.

The velocity sensors 1a to 1d can detect the velocity signal 1D using the number of revolutions of the wheels. The velocity input unit 3a can receive the velocity signal 1D transmitted from the velocity sensors 1a to 1d.

The friction-coefficient calculating unit 3b can calculate the friction coefficient 23 corresponding to the traveling velocity of a train for each of the brake shoes 8. That is, the friction-coefficient calculating unit 3b can calculate the brake initial velocity 22 using the velocity signal 1D, check the brake initial velocity 22 in the friction-coefficient setting table 20, and calculate the friction coefficient 23 corresponding to the brake initial velocity 22.

When receiving the brake command 2D, the brake-force calculating unit 3c can calculate, with respect to the friction coefficient 23 calculated by the friction-coefficient calculating unit 3b, the friction coefficient 23 corresponding to the brake notch 21, and the pressure control signal 3D using the calculated friction coefficient 23.

A process of calculating the pressure control signal 3D is described. With reference to FIGS. 1 and 2, the signal outputted by the air brake controller 3 is the "pressure control signal 3D". However, the brake cylinder pressure 5D is obtained by amplifying the pressure control signal 3D and this brake cylinder pressure 5D acts on the brake shoe 8. Therefore, in the following explanations, the "pressure control signal 3D" is described as the "brake cylinder pressure 5D".

The friction-coefficient calculating unit 3b calculates the friction coefficient 23 corresponding to the brake initial velocity 22 using the velocity signal 1D. When receiving the brake command 2D transmitted from the brake command unit 2, the brake-force calculating unit 3c calculates the friction coefficient 23 corresponding to the brake notch 21.

The "brake cylinder pressure 5D" can be calculated by a formula $B=F/(k*f)$ (B: brake cylinder pressure, F: brake force, k: constant, f: friction coefficient 23). The brake-force calculating unit 3c substitutes the friction coefficient 23 corresponding to the brake initial velocity 22 and the brake notch 21 and a brake force value required for braking for the above formula to calculate the "brake cylinder pressure 5D" continuously.

An overall operation of the train braking device 11 is described using specific values. The friction-coefficient calculating unit 3b calculates the brake initial velocity 22 using the velocity signal 1D. For example, when the brake initial velocity 22 is 60 km/h, the friction-coefficient calculating unit 3b calculates any of "μ13" to "μ73" in the friction coefficient setting table 20.

When receiving the brake command 2D, the brake-force calculating unit 3c selects "μ13" in the case that, for example, the brake notch 21 is B1. The brake-force calculating unit 3c further calculates the "brake cylinder pressure 5D" using the friction coefficient 23 "μ13" and a required brake force value.

When the brake-force calculating unit 3c continues to receive the brake command 2D, the traveling velocity of a train continues to be reduced. The friction-coefficient calculating unit 3b can calculate the friction coefficient 23 continuously according to changes in the traveling velocity. That is, while the brake-force calculating unit 3c continues to receive the brake command 2D, the friction coefficient 23 can be varied. For example, when the brake initial velocity 22 is 60 km/h and the brake notch 21 is B1, "μ13" is selected first as the friction coefficient 23. When the brake-force calculating unit 3c continues to receive the brake command 2D thereafter, the friction coefficient 23 changes continuously such as "μ13"→"μ12"→"μ11"→"μ10". Further, the brake-force calculating unit 3c can calculate the "brake cylinder pressure 5D" continuously from the friction coefficients 23 "μ10" to "μ13" and the brake force value. Even when the brake notch 21 is changed from B1 to B2 during the operation, the friction coefficient 23 can be changed continuously.

Figure 5:
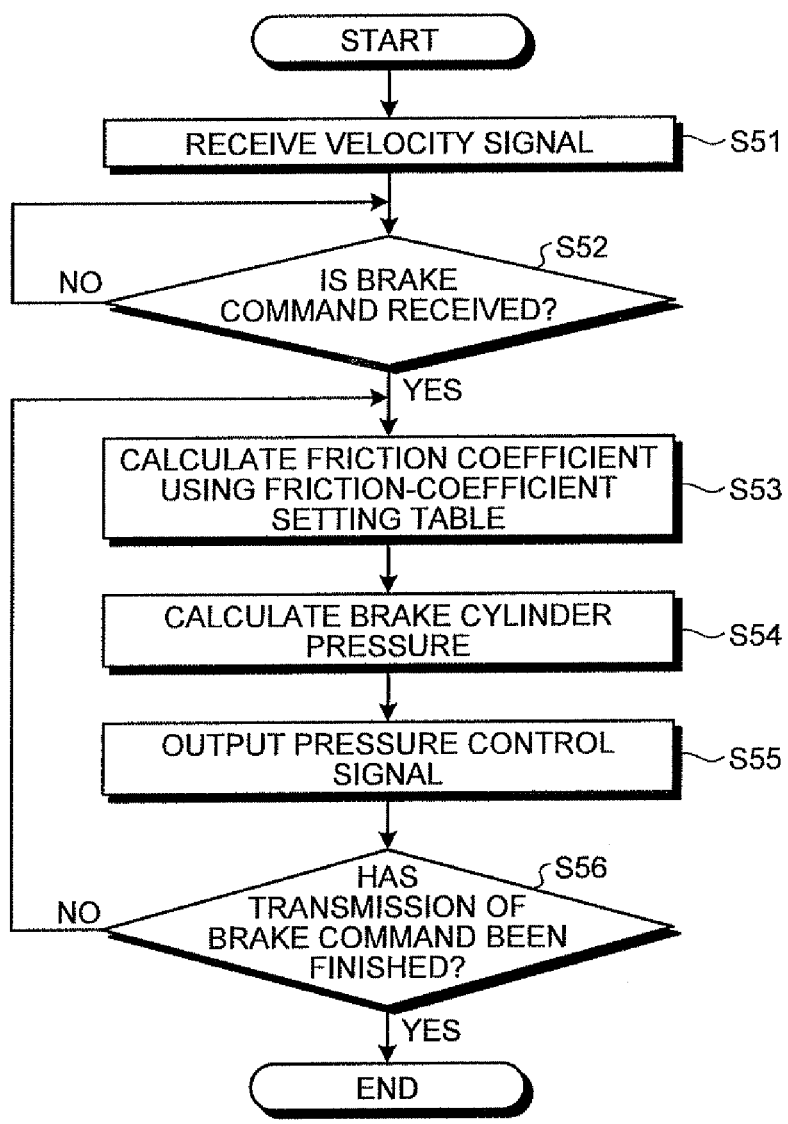
FIG. 5 is a flowchart of an example of a flow of determining a brake cylinder pressure using a friction coefficient setting table.

FIG. 5 is a flowchart of an example of a flow of determining the brake cylinder pressure using a friction coefficient setting table. The friction-coefficient calculating unit 3b and the brake-force calculating unit 3c receive the velocity signal 1D (Step S51) to calculate the friction coefficient 23 corresponding to the brake initial velocity 22. When receiving the brake command 2D (YES at Step S52), the friction-coefficient calculating unit 3b and the brake-force calculating unit 3c calculate the friction coefficient 23 corresponding to the brake notch 21 using the friction-coefficient setting table 20 (Step S53). The friction-coefficient calculating unit 3b and the brake-force calculating unit 3c calculate the "brake cylinder pressure 5D (the pressure control signal 3D)" by the friction coefficients 23 and the brake force value (Step S54). The output unit 3d outputs the "brake cylinder pressure 5D (the pressure control signal 3D)" calculated by the friction-coefficient calculating unit 3b and the brake-force calculating unit 3c to the electropneumatic conversion valve 4 (Step S55). When transmission of the brake command 2D is finished (YES at Step S56), the air brake controller 3 finishes outputting the "brake cylinder pressure 5D".

When the friction-coefficient calculating unit 3b and the brake-force calculating unit 3c do not receive the brake command 2D (NO at Step S52), these units do not calculate the friction coefficient 23 until receiving the brake command 2D. When the brake command 2D continues to be transmitted (NO at Step S56), the friction-coefficient calculating unit 3b and the brake-force calculating unit 3c repeat processes subsequent to the Step S53 and calculate the "brake cylinder pressure 5D" corresponding to the traveling velocity continuously from the friction coefficient 23 and the brake force value required.

As described above, the train braking device 11 according to the first embodiment uses the friction-coefficient setting table 20 to vary the friction coefficient 23 of each of the brake shoes 8 according to a change in the traveling velocity of a train. Thus, stable deceleration can be obtained for the entire train. Because a difference in the maximum adhesion between the wheels 10 (a longitudinal force acting on a contact portion of the wheel 10 and a rail) can be reduced, for example, the probability that a train slides at the time of emergency braking can be reduced and a braking distance can be reduced as compared to conventional cases. Further, because the probability that a train slides can be reduced, generation of flat of each of the wheels 10 (a damage generated when the wheel 10 is locked) is reduced, the number of cutting processes of the wheel 10, noises and vibrations while a train travels, and deterioration in riding comfortability can be suppressed. Because cutting of the wheel 10 is reduced, the wheel 10 can be used for a long time.

Second Embodiment

The train braking device 11 according to a second embodiment is configured to reduce a difference in the friction coefficient 23 caused by a difference in the period of use between the brake shoes 8 and to achieve stable deceleration. The configuration of the train braking device 11 of the second embodiment is identical to that of the first embodiment shown in FIGS. 1 and 2.

A brake force can be derived from the product of the brake cylinder pressure 5D and the friction coefficient 23 as described above. While replacement cycles of the brake shoes 8 are different from one another depending on the number of passengers and usage environments, the friction coefficient 23 of the brake shoe 8 usually decreases as the period of use is extended. That is, the friction coefficient 23 of the brake shoe 8, whose replacement time is earlier and whose traveling distance (the period of use) is long, is lower than that of the brake shoe 8 whose replacement time is recent. In a train that one brake shoe 8 whose replacement time is earlier and the other brake shoe 8 whose replacement time is recent are used together, when an air brake is operated, one wheel 10 is braked appropriately, but the other wheel 10 can slide beyond the maximum adhesion between the wheel 10 and a rail because a brake force is too strong. The brake force depends substantially on the friction coefficient 23. Accordingly, if the difference in the friction coefficient 23 between the wheels 10 can be reduced, a stable brake force can be obtained. The train braking device 11 according to the second embodiment is thus configured to provide a plurality of friction coefficient patterns for various periods of use of the brake shoes 8 in the air brake controller 3 for varying the friction coefficient 23 of each of the brake shoes 8.

Figure 4:
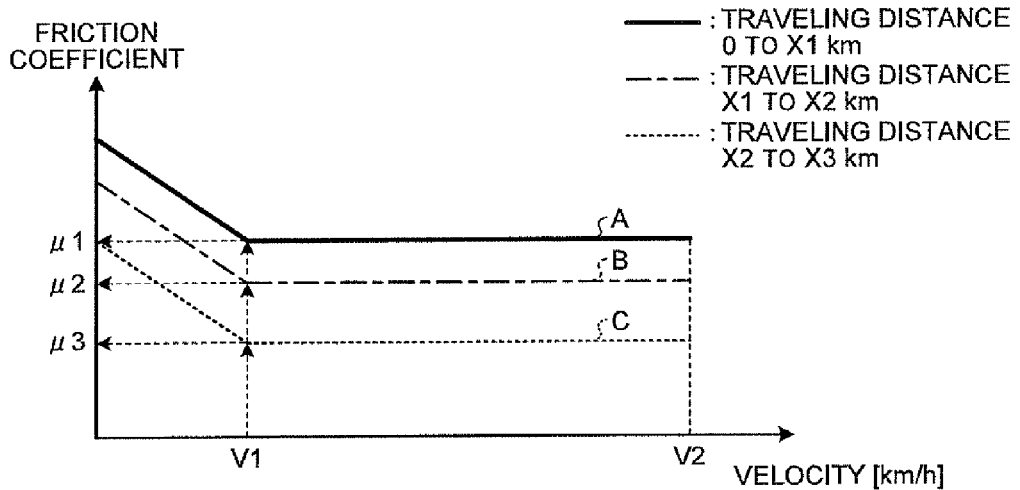
FIG. 4 is an example of a friction coefficient pattern.

FIG. 4 is an example of friction coefficient patterns. The vertical axis indicates the friction coefficient 23 of the brake shoe 8 and the horizontal axis indicates the traveling velocity of a train. Three lines indicated by a solid line, a dashed-and-dotted line, and a broken line in FIG. 4 are examples of the friction coefficient patterns mentioned above.

A friction coefficient pattern A is for the brake shoe 8 in a case that the traveling distance is 0 km to X1 km (a long time has not elapsed since the previous replacement time). A friction coefficient pattern B is for the brake shoe 8 in a case that the traveling distance is X1 km to X2 km. A friction coefficient pattern C is for the brake shoe 8 in a case that the traveling distance is X2 km to X3 km (a long time has elapsed since the previous replacement time). The friction coefficient patterns A to C are merely examples. The present invention does not limit the friction coefficient pattern to three and more patterns can be set. Values for X1 to X3 can be set arbitrarily.

As for the friction coefficient 23 that corresponds to the traveling velocity, for example, when the traveling velocity is V1 km/h, the friction coefficient is "μ1" in the case that the friction coefficient pattern is "A", "μ2" in the case that the friction coefficient pattern is "B", and "μ3" in the case that the friction coefficient pattern is "C". μ1 to μ3 are predetermined friction coefficients 23 used for calculating the brake cylinder pressure 5D.

While a dynamic friction coefficient (a friction coefficient when an object is moving) generally indicates a constant value, it can be in inverse proportion to the traveling velocity when a friction force is several to several tens of percent. In a region from a traveling velocity V2 to the traveling velocity V1 shown in FIG. 4, the friction coefficient 23 is almost fixed as the traveling velocity changes. In a region from the traveling velocity V1 to 0 km/h, however, the friction coefficient 23 is increased as the traveling velocity decreases. Such a phenomenon is common to the friction coefficient patterns A to C.

As described above, the friction coefficient 23 of the brake shoe 8 varies according to the traveling velocity of a train and the time for replacement of the brake shoe 8. The train braking device 11 according to the second embodiment is configured to set these variations in advance for controlling the brake cylinder pressure 5D appropriately. That is, in the train braking device 11, the air brake controller 3 records therein the time for replacement of each of the brake shoes 8, calculates the traveling distance using the time for replacement as a starting point, and derives each of the friction coefficient patterns A to C for the traveling distance. Further, the friction coefficient of each of the brake shoes 8 can be calculated by the relationship between each of the friction coefficient patterns A to C and the traveling velocity of a train.

In FIG. 2, the friction-coefficient calculating unit 3b can calculate the friction coefficient 23 of each of the brake shoes 8 for the traveling distance of a train. That is, the friction-coefficient calculating unit 3b calculates the traveling distance using the velocity signal 1D and then any of the friction coefficient patterns A to C using the calculated traveling distance. The friction-coefficient calculating unit 3b checks the traveling velocity against the friction coefficient patterns A to C to calculate the friction coefficient 23 for each friction coefficient pattern.

The brake-force calculating unit 3c receives the brake command 2D transmitted from the brake command unit 2 to calculate a brake force for the brake command 2D. The brake-force calculating unit 3c then calculates the "brake cylinder pressure 5D" using the friction coefficient 23 calculated for each of the friction coefficient patterns and the brake force value mentioned above.

An overall operation of the train braking device 11 is described below using specific values. The friction-coefficient calculating unit 3b calculates the traveling distance using the velocity signal 1D. For example, when the traveling distance is X1 km to X2 km in one brake shoe 8, the friction coefficient pattern B for the one brake shoe 8 is derived. Further, when the traveling velocity is V1, the traveling velocity V1 is checked against the friction coefficient pattern B to calculate the friction coefficient 23, that is, "μ2".

The brake-force calculating unit 3c receives the brake command 2D transmitted from the brake command unit 2 to calculate the brake force for the brake command 2D. Further, the brake-force calculating unit 3c calculates the "brake cylinder pressure 5D" using the friction coefficient 23, that is, "μ2" and the brake force value.

The friction coefficient patterns A to C can be calculated for each of the brake shoes 8. For the friction coefficient 23, for example, "μ1" calculated using the traveling velocity V1 and the friction coefficient pattern A and the friction coefficient 23, for example, "μ3" calculated using the traveling velocity V1 and the friction coefficient pattern C, the "brake cylinder pressure 5D" can be calculated for each of the brake shoes 8.

In the friction-coefficient calculating unit 3b, the friction coefficient 23 can be provided by combining the friction coefficient patterns A to C and the friction-coefficient setting table 20 shown in FIG. 3. That is, by setting the friction-coefficient setting tables 20 for the respective friction coefficient patterns A, B, and C in advance in the friction-coefficient calculating unit 3b, the friction coefficient 23 according to a change in the velocity of a train, a brake notch, and the period of use of the brake shoe 8 can be derived.

Figure 6:
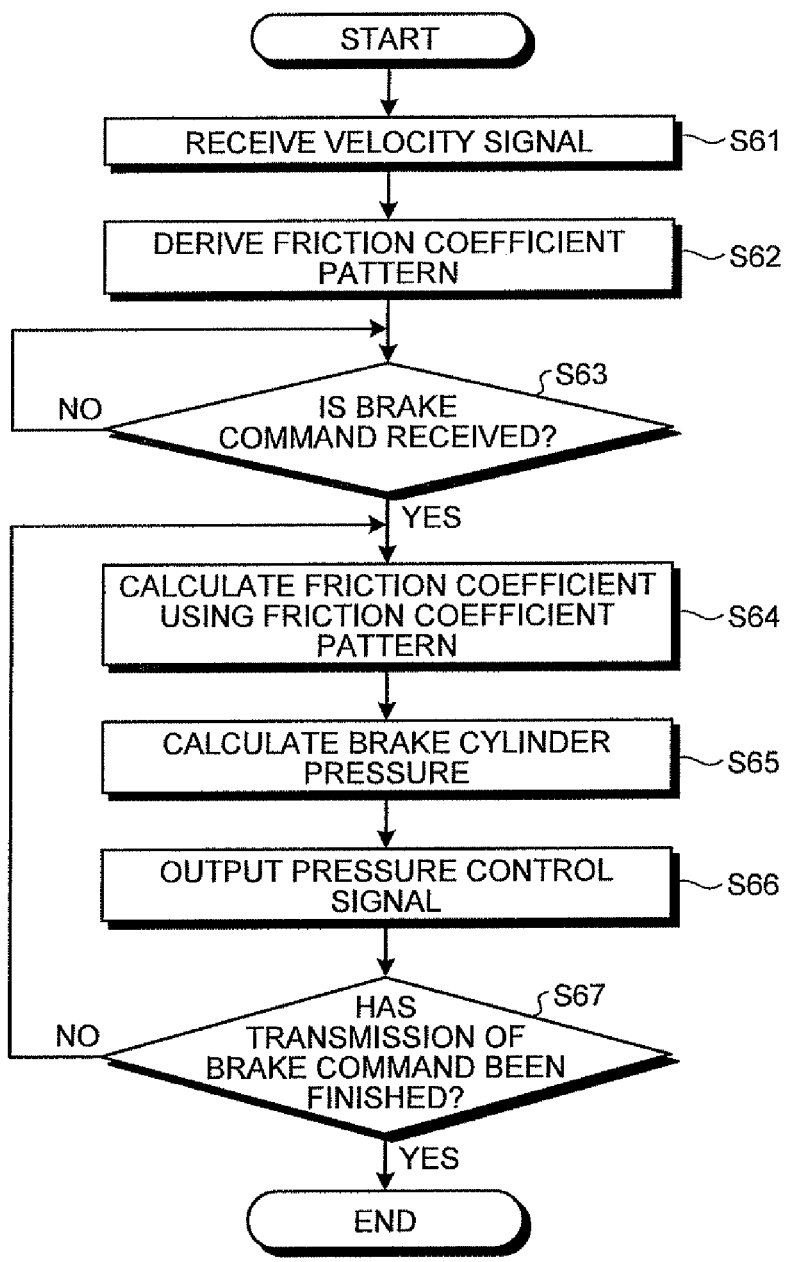
FIG. 6 is a flowchart of an example of a flow of determining a brake cylinder pressure using a friction coefficient pattern.

FIG. 6 is a flowchart of an example of a flow of determining a brake cylinder pressure using a friction coefficient pattern. The friction-coefficient calculating unit 3b and the brake-force calculating unit 3c receive the velocity signal 1D (Step S61), calculate the traveling distance using the velocity signal 1D to provide the friction coefficient pattern for each of the brake shoes 8 (Step S62). When the friction-coefficient calculating unit 3b and the brake-force calculating unit 3c receive the brake command 2D (YES at Step S63), the units check the traveling velocity against the friction coefficient pattern and calculate the friction coefficient 23 (Step S64). The friction-coefficient calculating unit 3b and the brake-force calculating unit 3c calculate the "brake cylinder pressure 5D" (the pressure control signal 3D) using the friction coefficient 23 and the brake force value (Step S65). The output unit 3d outputs the "brake cylinder pressure 5D" (the pressure control signal 3D) calculated by the friction-coefficient calculating unit 3b and the brake-force calculating unit 3c to the electropneumatic conversion valve 4 (Step S66). When transmission of the brake command 2D is finished (YES at Step S67), the air brake controller 3 finishes output of the "brake cylinder pressure 5D".

When the friction-coefficient calculating unit 3b and the brake-force calculating unit 3c do not receive the brake command 2D (NO at Step S63), these units do not calculate the friction coefficient 23 until they receive the brake command 2D. When the brake command 2D continues to be transmitted (NO at Step S67), the friction-coefficient calculating unit 3b and the brake-force calculating unit 3c repeat processes subsequent to Step S64 and calculate continuously the "brake cylinder pressure 5D" corresponding to any of the friction coefficient patterns A to C and the traveling velocity using the friction coefficient 23 and the brake force value required.

As described above, according to the train braking device 11 of the second embodiment, the friction coefficient pattern corresponding to the period of use of each of the brake shoes 8 is derived and the friction coefficient 23 of each of the brake shoes 8 is varied. Stable deceleration can thus be obtained for the entire train. Because the difference in the maximum adhesion between the wheels 10 can be reduced, the probability that a train slides at the time of emergency braking can be reduced and a braking distance can be reduced as compared to conventional cases. Further, because the probability that a train slides can be reduced, generation of flat of each of the wheels 10 is reduced and the number of cutting processes of the wheel 10, noises and vibrations while a train travels, and deterioration in riding comfortability can be suppressed. Moreover, because cutting of the wheel 10 is reduced, the wheel 10 can be used for a long time. Even when the friction coefficients 23 of the brake shoes 8 are different from one another, a stable brake force can be obtained. Accordingly, an operation of replacing the brake shoe 8 to make the friction coefficients 23 be coincident with each other is eliminated, and thus costs relating to the replacement of the brake shoe 8 can be reduced and the brake shoe 8 can be used for a long period.

INDUSTRIAL APPLICABILITY

As described above, the train braking device according to the present invention is useful as a train braking device having an air brake controller.

The invention claimed is:

1. A train braking device for controlling a brake cylinder pressure based on a pressure control signal, the train braking device comprising:
   an air brake controller that stores therein a plurality of friction coefficients corresponding to a brake initial velocity and a brake command and generates the pressure control signal based on the friction coefficients corresponding to the brake initial velocity and the brake command;
   an electropneumatic conversion valve that converts the pressure control signal into a pneumatic signal; and
   a relay valve that generates the brake cylinder pressure corresponding to the pneumatic signal.

2. The train braking device according to claim 1, wherein the air brake controller stores therein the friction coefficients corresponding to the brake initial velocity and the brake command for each brake shoe and generates the pressure control signal based on the friction coefficient corresponding to the brake initial velocity and the brake command for each brake shoe.

3. The train braking device according to claim 1, wherein the air brake controller records therein a period of use of each brake shoe based on a velocity signal and generates the pressure control signal based on the friction coefficients corresponding to the period of use and a traveling velocity of a train for each brake shoe.

4. A method employed in a train braking device for controlling a brake cylinder pressure based on a pressure control signal, the method comprising:
   storing in the train braking device a plurality of friction coefficients corresponding to a brake initial velocity and a brake command;
   generating the pressure control signal based on the friction coefficients corresponding to the brake initial velocity and the brake command;
   converting the pressure control signal into a pneumatic signal; and
   generating the brake cylinder pressure corresponding to the pneumatic signal.

5. The method according to claim 4, wherein the storing includes storing therein the friction coefficients corresponding to the brake initial velocity and the brake command for each brake shoe, and
   the generating includes generating the pressure control signal based on the friction coefficient corresponding to the brake initial velocity and the brake command for each brake shoe.

6. The method according to claim 4, wherein the storing includes storing therein a period of use of each brake shoe based on a velocity signal, and
   the generating includes generating the pressure control signal based on the friction coefficients corresponding to the period of use and a traveling velocity of a train for each brake shoe.

* * * * *